Nov. 22, 1938.   V. HIGBIE ET AL   2,137,399
AIRCRAFT ENGINE INTERCOOLER
Filed Dec. 11, 1936   2 Sheets-Sheet 1

INVENTORS
RAYMOND W. YOUNG and
VINTON HIGBIE.
BY
ATTORNEY.

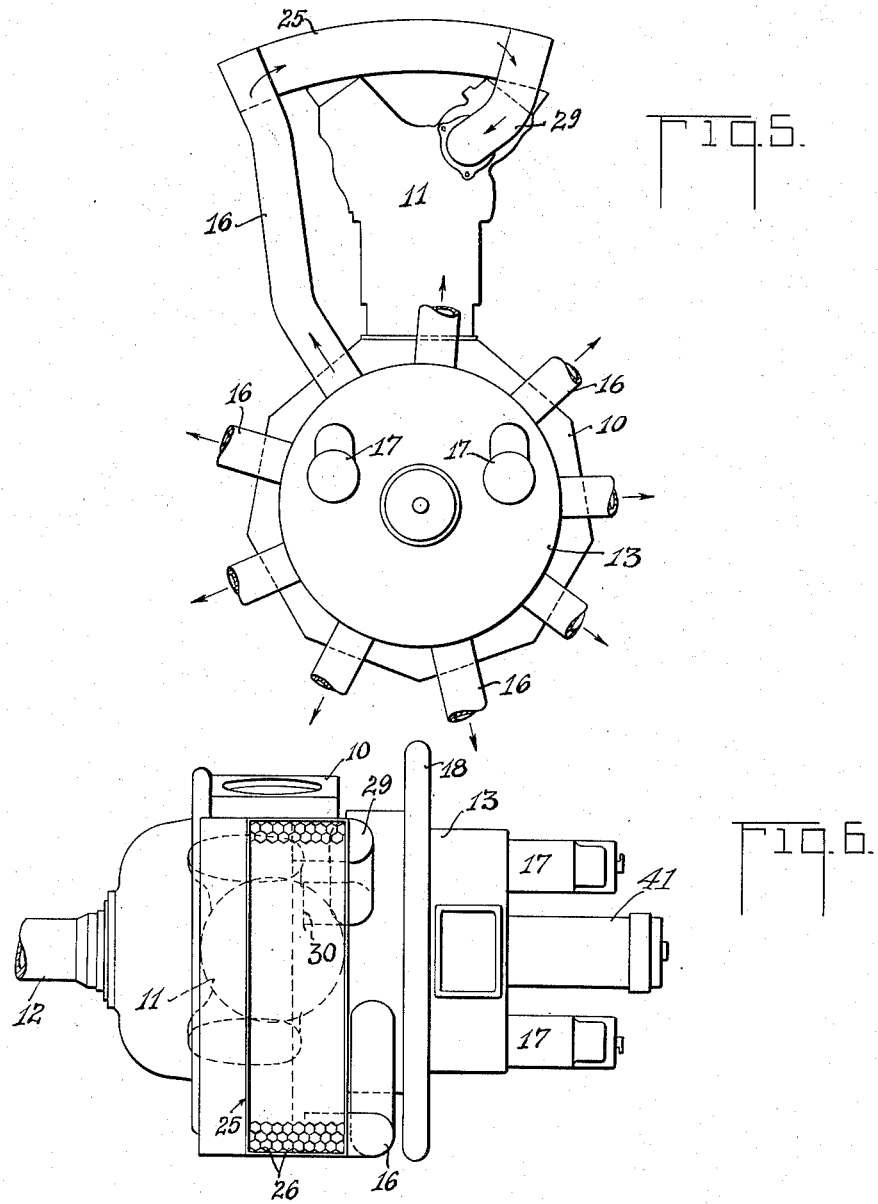

Patented Nov. 22, 1938

2,137,399

UNITED STATES PATENT OFFICE 2,137,399

AIRCRAFT ENGINE INTERCOOLER

Vinton Higbie, Paterson, and Raymond W. Young, Maywood, N. J., assignors to Wright Aeronautical Corporation, a corporation of New York Application December 11, 1936, Serial No. 115,314

4 Claims. (Cl. 123—55)

This invention relates to aircraft power plants and is particularly concerned with improvements in intercoolers for such power plants.

In the development of aircraft power plants, the constant objective is to obtain an increased ratio of available power with reference to the weight of the power plant, and also, it becomes necessary to provide means whereby the intake pressures for the engine may be increased, or may be maintained substantially at ground atmospheric pressure when engine is operating at high altitude. To generally accomplish these ends, engines are equipped with superchargers, either driven directly by the engine, or driven by an exhaust turbine. Such superchargers serve to compress atmospheric air increasing its density, whereby greater power may be obtained from the engine. However, it is well known in thermodynamics, that quick compression of gases increases their temperature and when the degree of supercharge in the power plant is high, the air temperatures are raised to such an extent that pre-ignition may occur in the engine, and the maximum amount of air cannot be drawn into the engine cylinder, due to its elevated temperature. Accordingly, intercoolers are sometimes provided between the supercharger and the engine cylinders, such intercoolers usually comprising heat exchange radiators through which the compressed charge passes to be cooled by atmospheric airflow thereover. The compact and efficient arrangement of such intercoolers presents a problem of major proportion, since the power plant installation is limited as to space available and it is essential to maintain the aerodynamic cleanness of the power plant to obtain maximum speed characteristics in the aircraft.

Accordingly, it is an objective of this invention to provide an intercooler arrangement for an aircraft power plant which, while giving adequate intercooler effect, will occupy the minimum amount of space. A further object of the invention is to provide an intercooler organization which may be incorporated as part of the anti-drag cowling normally embracing air cooled radial cylinder aircraft engines. Still another object is to provide a plurality of intercoolers, one for each engine cylinder, the intercoolers being of a volumetric capacity substantially equal to the individual cylinder displacement. Thereby, a fuel or air charge lying within the intercooler, dwells there for a certain time interval determined by the time necessary for a complete cycle of engine operation. When a cylinder withdraws its fuel or air charge from the intercooler, such charge has been cooled by its dwell in the intercooler and immediately upon withdrawal of the charge, a fresh charge, equal to the next charge necessary for the cylinder, is drawn into the intercooler to dwell therein until such charge is subsequently withdrawn. Further objects of the invention will become apparent in reading the annexed detailed description and in viewing the drawings in which:

Fig. 5 is a rear elevation of part of the aircraft power plant, and

Fig. 6 is a plan of part of the aircraft power plant.

Figure 1:
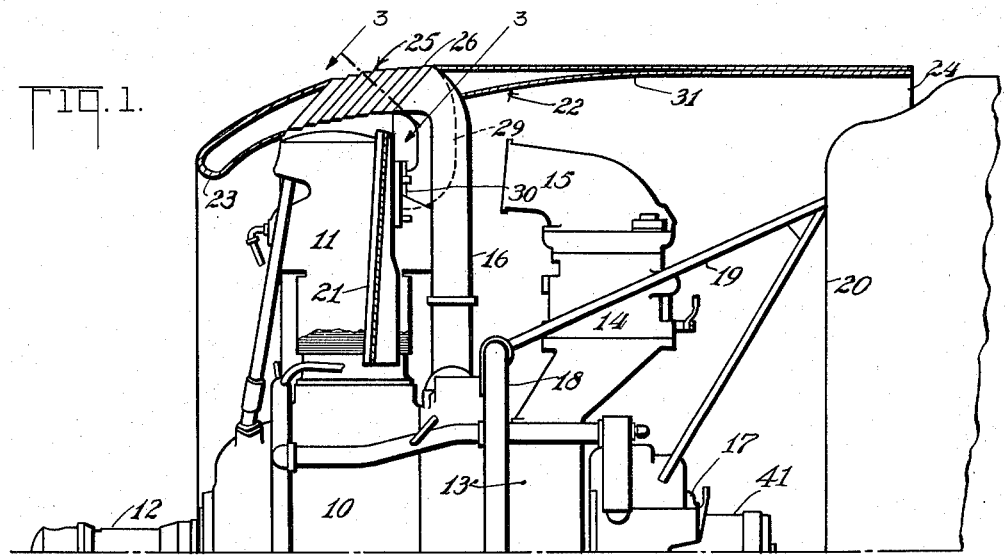
Fig. 1 is a partial axial elevation through an aircraft power plant incorporating the features of this invention.

The power plant shown includes an engine crankcase 10 having a plurality of finned air cooled radially arranged cylinders 11 extending therefrom. The power shaft of the engine is designated as 12 and is organized in the conventional manner to carry a propeller (not shown). The engine includes a supercharger section 13 upon which is mounted a carburetor 14 having an intake air scoop 15. Discharge from the supercharger is effected through a plurality of pipes 16, one for each engine cylinder. The supercharger unit 13 is not shown in detail since its construction is well known in the art. In the embodiment shown, the supercharger is driven by the engine and includes an impeller substantially concentric with the power shaft 12. Rearward of the supercharger section 13 is a rear section carrying certain engine accessories such as the magnetos 17. The engine is mounted on a ring 18 attached by suitable bracing 19 to the fuselage 20.

Between adjacent radial cylinders are provided conventional inter-cylinder baffles 21, so formed as to direct cooling airflow from the front of the engine to the rearward parts of the cylinders. Such baffling serves to build up a pressure differential between the front and back of the engine cylinders, whereby cooling airflow is augmented adjacent the surfaces to be cooled in the cylinders.

Encircling the engine is an annular cowling 22, exteriorly profiled to provide a streamlined forward continuation of the fuselage 20. Such cowling is preferably inturned at its leading edge as at 23, and cool air for the engine is entrained within said leading edge, the air passing between the baffles 21 and cylinders 11 and flowing from the interior of the cowling through an exit slot 24 provided between the trailing edge of the cowling 22 and the fuselage 20.

Figure 2:
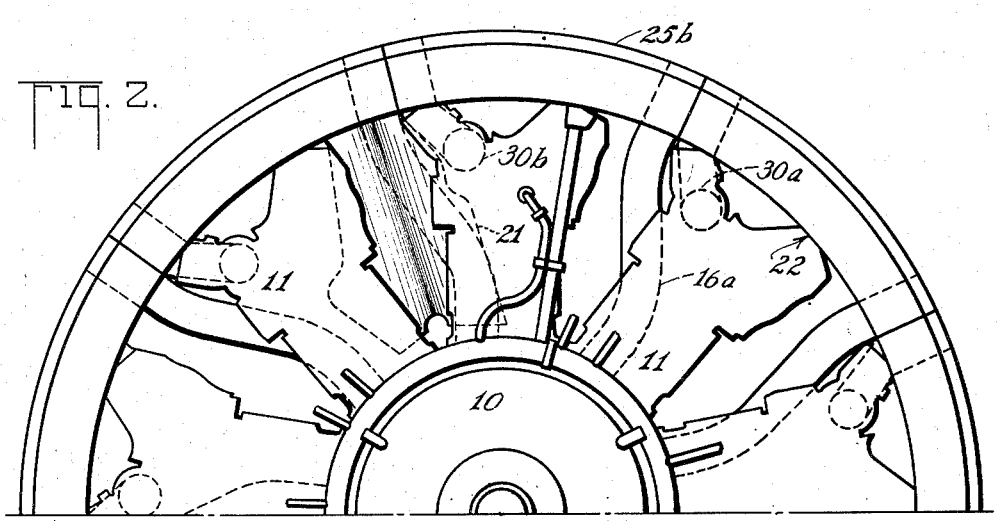
Fig. 2 is a front elevation of a part of the aircraft power plant.
Figures 3, 4:
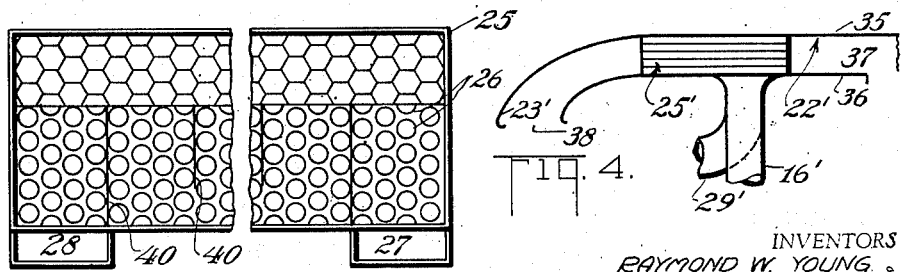
Fig. 3 is an enlarged section on the line 3—3 of Fig. 1.
Fig. 4 is a diagrammatic axial elevation of an alternative form of intercooler arrangement.

We incorporate a plurality of intercoolers in the cowling 22, these intercoolers being designated as 25 and comprising segmental tubular radiators made up of a plurality of nested tubes 26. The tube axes are slanted forwardly and inwardly so that cooled air beneath the cowl leading edge 23 may pass outwardly and rearwardly through the bores of the tubes 26. It should be noted that the intercooler 25 is located forward of the baffles 21, so that the entering edges of the radiator tubes are in the high pressure region within the engine cowling. The exit portions of the tubes of the radiator lie substantially flush with the outer surface of the cowling 22. The cowling outer surface in the region of the exit portions of the tubes 26 is known to be in a region of low pressure, due to the aerodynamic effect produced by the cowling in its passage through the air. Thus, airflow through the radiator tubes is augmented by virtue of high pressure at the entering ends of the tubes and low pressure at the exit ends of the tubes. According to well known principles of tube radiator construction, the tubes 26 are spaced from one another in the body of the cooler 25, providing inter-tube spaces through which the fuel charge may pass, and dwell, so that the fuel charge comes in direct contact with the surfaces of the tubes which are cooled by the previously mentioned cooling airflow. In Fig. 3, at the top portion of the intercooler, the tubes 26 are hexagonally formed for abutment one against the other, while the lower portion of Fig. 3, in effect is a section through the core of the radiator, showing the tubes 26 in spaced relation to one another. The inter-tube space of the radiator 25 is provided with entrance and exit ducts 27 and 28, the duct 27 being directly connected to the supercharger exit 16, and the duct 28 being connected by a pipe 29 to the intake port 30 of the cylinder. As will be noted in Fig. 2, the several pipes 16 emanate radially from the supercharger section 13, and the segmental radiators 25 are so disposed that the fuel charge entering each radiator at one end discharges through a connection, directly to each cylinder at the other end. This disposition of segmental intercoolers permits of their application to existing types of engines. In such existing engine types, the pipe 16a in Fig. 2 would normally serve the cylinder intake port 30a. With the intercoolers installed, the pipe 16a will be connected to the intercooler 25b in turn connected with the cylinder intake port 30b. Accordingly, the intake pipes will serve the next cylinder to that which they would normally serve without the intercooler installation, but this would have no harmful effect so far as engine operation is concerned.

The segmental radiator units 25 should normally be attached to their respective cylinders, and conveniently, the leading edge ring cowl portion 23 may be fabricated as a separate unit for attachment either to the radiators or to the cylinders, likewise the rearward portion of the ring cowl 23 indicated as 31 may be a separate annular section for independent attachment to the intercoolers or to the engine mounting structure.

In Fig. 4 we show an alternative disposition of the intercoolers and cowling wherein the cowling 22' comprises an outer element 35 and an inner element 36 in spaced relation thereto, providing between the two elements an air conducting passage 37. The forward ends of elements 35 and 36 are so formed as to provide an air entrance opening 38 radially disposed beneath the normal cowl leading edge 23'. We place the segmental intercoolers 25' in the passage 37, the axes of the tubes which form the intercoolers being longitudinally disposed in line with airflow through the passage 37. The entrance and exit passages for the interior of the intercooler 25' are designated as 16' and 29' in Fig. 4 and are connected to the supercharger and engine cylinder respectively as above described.

It should be particularly pointed out that we prefer to so proportion each intercooler 25 as to have a volumetric capacity of fuel charge substantially equal to the displacement of the corresponding engine cylinder. By this means, a full charge of fuel or air is permitted to dwell in the intercooler for a length of time equal to that required for a complete cycle of the engine, prior to its induction into the engine cylinder. Accordingly, a maximum of cooling effect is obtained for each fuel or air charge with a minimum of cooling area. Without doubt, if the intercoolers were either larger or smaller than those specified herein some cooling effect would be obtained, but we have found that the proportions as specified do give the greatest economy of weight and material with a maximum efficiency of cooling.

Uniform cooling of the fuel or air charge passing through the intercooler 25 may be augmented by arranging staggered baffles 40 between certain of the rows of tubes 26 in the intercoolers, by which the fuel or air charge passing through the intercooler is forced to follow a path which will address the full complement of tubes comprising the radiator.

Numeral 41 designates a conventional engine starter.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a supercharged power plant for aircraft, in combination, a radial cylinder engine, an annular cowl ring encircling the engine, baffles in the inter-cylinder spaces to augment the cooling airflow pressure differential between the front and rear of several cylinders, segmental intercooler radiators, one for each cylinder, arranged in the cowling and organized for cooling airflow therethrough and having their air entrances beneath the cowl and their air exits without the cowl, and pipes for each said intercooler connected respectively to the engine supercharger and to the corresponding engine cylinder.

2. In a supercharged power plant for aircraft, in combination, a radial cylinder engine, an annular cowl ring encircling the engine, baffles in the inter-cylinder spaces to augment the cooling airflow pressure differential between the front and rear of several cylinders, segmental intercooler radiators, one for each cylinder, arranged in the cowling and organized for cooling airflow therethrough and having their air entrances beneath the cowl and their air exits without the cowl, and pipes for each said intercooler connected respectively to the engine supercharger and to the corresponding engine cylinder, the cooling air flow entrance of said intercoolers being disposed forwardly of said inter-cylinder baffles.

3. In a supercharged aircraft power plant, in combination, a radial cylinder engine, a ring cowl embracing said engine and having an inturned leading edge portion ahead of the engine cylinders, intercoolers in said ring cowl comprising heat exchangers arranged to receive cooling air from the region within said cowl leading edge portion and to discharge cooling air in a rearward direction outwardly of said cowl, a supercharger forming part of the engine rearward of the engine cylinders, and conduits leading from said supercharger through said intercoolers to respective engine cylinders.

4. In an aircraft power plant including a radial cylinder engine, an intercooler for each cylinder comprising tubular heat transfer radiators adjacent the respective cylinder heads, the tubes of said radiators being slanted forwardly and inwardly toward the engine axis to receive cooling air from a point ahead of said engine, a conduit from the coolers to respective cylinders, and means to feed a fuel charge to each cooler for subsequent passage to the respective cylinder.

VINTON HIGBIE.
RAYMOND W. YOUNG.